3,672,912
TORTILLA AND PROCESS USING WATER SOLUBLE EDIBLE BORATE OR ALUMINATE
Manuel Jesus Rubio, Bridgeport, Conn., assignor to Roberto Gonzalez Barrera, Monterrey, Nuevo Leon, Mexico
No Drawing. Filed July 24, 1970, Ser. No. 58,137
Int. Cl. A23l 1/10
U.S. Cl. 99—80                    9 Claims

ABSTRACT OF THE DISCLOSURE

To retard the staling of tortillas, which are an unleavened unshortened food product made from nixtamalized corn or corn flour and to increase the yield of dough and tortillas by incorporating an additive in making the tortilla dough. The additive is water soluble edible borate or aluminate.

DISCLOSURE OF INVENTION

The present invention relates to retarding the staling of tortillas and increasing the yield of tortilla dough and tortillas.

Many expedients which apply for preventing staling to the usual wheat, whole wheat or rye bread, commonly eaten, are not effective when applied to tortillas because of the marked differences in their compositions from the breads mentioned above. Among these differences are:

(1) Tortillas are made from whole corn, that is, corn which contains its germ, hull, bran, etc. Bread is made from dehulled, degermed and debranned wheat.

(2) Dehulled, degermed, debranned wheat used in making bread undergoes no chemical treatment before grinding. Whole corn used in making tortillas always undergoes the chemical treatment of steeping in limewater at pH 12 before grinding.

(3) Dehulled, degermed, debranned wheat used in making bread is ground into a flour in the dry state. Steeped whole corn used in making tortillas is ground into a dough in the wet state, after which the dough is either dried into a flour or used directly to make tortillas.

(4) The dough used for making bread is always prepared from dry dehulled, degermed, debranned wheat flour. The dough used for making tortillas may be prepared either from dry limed corn flour or directly by grinding whole corn steeped in limewater at pH 12.

(5) In addition to dehulled, degermed, debranned wheat flour the dough used for making bread always contains some of the following ingredients: shortening, a leavening agent (yeast, air, or baking powder), salt, sugar, milk solids or milk, eggs or egg solids, and water. Dough used in making tortillas only contains ground limed whole corn and water.

(6) The final moisture content of bread after baking is approximately 20%; that of tortillas after cooking is approximately 45%. Due to its lower moisture content, bread is much less subject to microbial spoilage than tortillas.

(7) Bread is baked inside an oven by hot air at a temperature of 425–500° F. for 30–60 minutes. Tortillas are cooked on a hot plate at 290–410° F. each side or face being exposed alternately to the heat for 15–20 seconds, after which the first side is again exposed for an additional 15–20 seconds.

(8) Other differences between bread and tortillas are the following:

(a) Dehulled, degermed, debranned wheat flour used in breadmaking is usually bleached; limed corn flour used for making tortillas is never bleached.

(b) Bread is usually leavened, tortillas are never leavened.

(c) Bread is always baked in the shape of loaves or rolls; tortillas are always shaped in the form of round, flat discs.

(d) The structure of bread is largely due to the presence of proteins known as "glutelin and gliadin" which are components of dehulled, degermed, debranned wheat. Corn contains no such protein, so that the structure of tortillas is due mostly to their starch component.

The base material for making tortillas is limed corn dough, whose preparation is described below.

Flat discs of dough of diameter 4–6 inches and height 2–3 millimeters are prepared either by hand, by use of any mechanical equipment which squashes or presses pieces of dough, or by any suitable automatic machine.

After they have been made, the flat discs of dough are cooked on a hot plate whose temperature varies from 290–410° F. In the cooking process, each face or side of the disc is alternately exposed to the heat for 15–20 seconds, after which the first side is again exposed for an additional 15–20 seconds.

The cooked discs or tortillas have a moisture content of 40–28% and are ready to eat.

Limed corn dough may be prepared from limed corn flour of size smaller than 45 U.S. Standard Mesh, 8–12% moisture content and pH 6–7. The dough is made by mixing 1.0–1.4 pounds of tap water per pound of flour.

Limed corn dough may also be made directly by grinding corn which has been steeped in limewater. In such case 1 pound of corn is steeped overnight in 0.5–0.8 pound of water, initially at boiling temperature, which contains 0.5–1.5% calcium hydroxide. It should be noted that when the corn is added to the limewater, the latter is either at or close to its boiling temperature. However, after both ingredients have been mixed, no further heat is applied so that the temperature of the mixture drops gradually during the steeping process.

It might be mentioned that tortillas, when normally prepared as described as described herein and without additives of any kind, have a maximum shelf life of 12–15 hours. After such time they are spoiled by microorganisms and become hard or stale.

It is known that tortillas when kept under conditions in which no moisture is lost, nevertheless become hard and inflexible with the passage of time and break or crumble easily when flexed or bent. This effect increases with time. Freshly made tortillas are very flexible but lose their flexibility with the passage of time. Hardening is appreciable after twenty-four hours, marked after forty-eight hours and almost complete after seventy-two hours if the product is kept at room temperature. It should be noted that the hardening or staling effect increases with decreasing temperature until the freezing point of water in the product is reached. At temperatures below room temperature but above the freezing point of water in the tortillas, herefore, hardening proceeds at a faster rate than at room temperature and vice-versa.

In determining the flexibility index a tortilla is bent around a bar of known radius, and this is tried with successively smaller bars until a bar is found which is the smallest around which the tortilla just breaks when it is flexed. A more flexible tortilla will just break when it is bent around a smaller bar than a less flexible tortilla. A higher flexibility index corresponds therefore to bars of lower radii and indicates higher flexibility.

Table 1 gives typical values for variation of the flexibility index of tortillas with time at room temperature.

TABLE 1

Variation of the flexibility index of tortillas with time at room temperature

Flexibility index after the following elapsed time:

Hrs.
    0 _____ 8.5
    24 _____ 7.7
    48 _____ 6.5
    72 _____ 6.0
    96 _____ 5.5

Hardening or loss of flexibility of tortillas is believed to be due to a physico-chemical change in the starch constituent of tortillas which is known as retrogradation. This phenomenon has been studied in substances other than tortillas and is described in the technical literature (Whistler, 1965).

The additive of the present invention imparts the property of retarding the loss of flexibility of tortillas with time. It must be mixed with the dough used for making tortillas, although as later explained, the mixture may be achieved in various ways.

Thus, in respect to this aspect of the invention, tortillas stored under conditions in which no moisture is lost from them become stale more slowly because of the additive of the invention, which retards hardening with time, retards loss of flexibility with time, increases the freshness of the tortillas, prolongs the flexible shelf life of the tortillas and increases the freshness of both freshly made tortillas and also reheated tortillas.

Yield

It has been known that the yields of tortillas depend upon the ability of the dough or of the tortillas to retain water. The additive of the invention increases the water-binding ability of the dough and of the tortilla.

When tortilla dough is prepared from limed corn or limed corn flour, it has a certain consistency. When an additive of the invention is mixed with the dough, unless more water is added, the dough becomes stiffer and in order to obtain the consistency of tortilla dough without the additive, it is necessary to add more water to the dough. Thus, the yield of dough obtained per unit weight of limed corn or limed corn flour is increased. In the case of tortilla dough and tortillas the yield is the number of kilos of dough per kilo of corn, or the number of kilos of tortillas per kilo of corn, or the number of kilos or dough per kilo of limed corn flour or the number of kilos of tortillas per kilo of limed corn flour.

Similarly, when tortillas are prepared from ordinary limed corn dough, a certain amount of water is lost when they are cooked. If, however, tortillas are prepared from limed corn dough which contains the additive of the invention, an amount of water which is less than that from ordinary dough will be lost from the tortillas when they are cooked. The result is that the yield of tortillas obtained per unit weight of limed corn or limed corn flour will be increased.

Thus, in this aspect of the invention, the additive increases the yield of dough made from limed corn or limed corn flour and increases the yield of tortillas made from limed corn or limed corn flour.

Borates and Aluminates

Water soluble edible borates and aluminates are very effective in retaining flexibility in tortillas after storage without loss of moisture for extended periods.

These substances cross link with starch and are effective to prevent staling in concentrations in the range of 0.25 to 5%, preferably 0.25 to 2%, of the weight of the tortillas. Suitable water soluble edible borates are sodium metaborate, borax, potassium metaborate, and other similar compounds. Suitable water soluble edible aluminates are sodium and potassium aluminate.

Table 2 shows the effect of borates and aluminates in retarding the staling of tortillas which are stored without loss of moisture. It will be noted that these additives alone or in admixture are of substantial benefit.

TABLE 2.—TYPICAL FLEXIBILITY INDICES AT ROOM TEMPERATURE OBTAINED BY ADDITION OF DIFFERENT CROSS-BONDING SUBSTANCES TO TORTILLAS

| Dose of additive based on weight of tortillas | Flexibility index after (hours)— | | | |
|---|---|---|---|---|
| | 0 | 24 | 48 | 72 |
| Sodium borate: | | | | |
| 0.5% | 9.0 | 8.0 | 7.0 | 6.5 |
| 1.0% | 9.5 | 9.0 | 8.5 | 8.0 |
| 2.0% | 10.0 | 10.0 | 10.0 | 10 |
| Sodium aluminate: | | | | |
| 0.5% | 9.0 | 8.8 | 8.5 | 7.5 |
| 1.0% | 9.3 | 9.3 | 8.8 | 8.3 |
| 2.0% | 9.5 | 9.5 | 9.0 | 9.0 |
| Control | 8.5 | 6.5 | 5.7 | 5.7 |

Water soluble edible borate or aluminate will greatly increase the yield as shown in Table 3.

TABLE 3.—TYPICAL YIELD VALUES OBTAINED BY ADDITION OF SODIUM BORATE AND SODIUM ALUMINATE TO DOUGH AND TORTILLAS MADE FROM LIMED CORN FLOUR

| Dose of additive based on weight of tortillas | Yield of dough, kilos per kilo of flour | Yield of tortillas, kilos per kilo of flour |
|---|---|---|
| 0.0% (control) | 2.239 | 1.767 |
| Sodium borate: | | |
| 0.5% | 2.286 | 1.818 |
| 1.0% | 2.418 | 1.920 |
| 2.0% | 2.513 | 2.090 |
| Sodium aluminate: | | |
| 0.5% | 2.392 | 1.913 |
| 1.0% | 2.478 | 1.928 |
| 2.0% | 2.658 | 2.203 |

These materials may be added in the dough as aqueous solutions in the watery component or as separate watery constituents incorporated after the dough has been made.

EXAMPLE 1

Tortilla dough is made by mixing nixtamalized corn flour into a suitable quantity of water, about 150 percent on the dry ingredients into which sodium metaborate has been dissolved in a concentration which will constitute 2% of the weight of the tortillas. The results are stated in Table 2.

EXAMPLE 2

The procedure of Example 1 is carried out except that the sodium metaborate is mixed as dry powder with the limed corn flour before incorporating in the water. The results are the same.

EXAMPLE 3

Sodium aluminate is dissolved in the water to be incorporated in the tortilla dough made by mixing nixtamalized corn flour, with about 160 percent of water on the weight of the dry ingredients. The quantity of sodium aluminate is 2% of the tortillas. The result is listed in Table 2.

In view of my invention and disclosure, variations and modifications to meet individual whim or particular need will doubtless become evident to others skilled in the art, to obtain all or part of the benefits of my invention without copying the process and composition shown, and I therefore claim all such insofar as they fall within the reasonable spirit and scope of my claims.

Having thus described my invention, what I claim as new and desire to secure by Letters Patent is:

1. A tortilla essentially consisting of nixtamalized corn or nixtamalized corn flour and an additive of the class consisting of water soluble edible borates and water soluble edible aluminates in the concentration of 0.25 to 5% of the weight of the tortillas.

2. A tortilla of claim 1, in which the additive is sodium borate.

3. A tortilla of claim 1, in which the additive is sodium aluminate.

4. Tortilla dough essentially consisting of nixtamalized corn or nixtamalized corn flour and an additive of the class consisting of water soluble edible borates and water soluble aluminates in the concentration of 0.25 to 5% of the weight of the tortillas.

5. Tortilla dough of claim 4, in which the additive is sodium borate.

6. Tortilla dough of claim 4, in which the additive is sodium aluminate.

7. A process of improving the flexibility of tortillas made from tortilla dough after storage for a time without loss of moisture and for improving the yield which comprises mixing nixtamalized corn or nixtamalized corn flour with water to make tortilla dough and incorporating in the tortilla dough from 0.25 to 5% by weight of the tortillas of a compound of the class consisting of water soluble edible borate and aluminate.

8. A process of claim 4, in which the additive is sodium borate.

9. A process of claim 4, in which the additive is sosodium aluminate.

References Cited

UNITED STATES PATENTS

| | | | |
|---|---|---|---|
| 2,584,893 | 2/1952 | Lloyd et al. | 99—93 |
| 2,704,257 | 3/1955 | DeSollano et al. | 99—93 |

OTHER REFERENCES

Zelayeta, "Elena's Secrets of Mexican Cooking" Prentice-Hall Inc., Englewood Cliffs, N.J., 1962, pp. 115–121.

RAYMOND N. JONES, Primary Examiner